US005866233A

United States Patent [19]

Oshima et al.

[11] Patent Number: 5,866,233

[45] Date of Patent: Feb. 2, 1999

[54] DECORATIVE SHEET WITH CHANGEABLE COLOR OR DENSITY

[75] Inventors: Masahiro Oshima; Katumi Shimizu; Taturo Otani, all of Osaka, Japan

[73] Assignee: Meiwa Gravure Co., Ltd., Osaka, Japan

[21] Appl. No.: 659,910

[22] Filed: Jun. 7, 1996

[30] Foreign Application Priority Data

Jun. 12, 1995 [JP] Japan .................................... 7-144358

[51] Int. Cl.[6] .............................. B32B 3/00; A47G 35/00

[52] U.S. Cl. .......................... 428/172; 478/167; 478/187; 478/195; 478/207; 478/212; 478/542.2

[58] Field of Search .................................... 428/156, 172, 428/167, 209, 207, 141, 187, 212, 542.2

[56] References Cited

U.S. PATENT DOCUMENTS

| | | | |
|---|---|---|---|
| 5,204,160 | 4/1993 | Rouser et al. | 428/107 |
| 5,254,390 | 10/1993 | Lu | 428/156 |
| 5,270,097 | 12/1993 | Amemiya et al. | 428/156 |
| 5,429,857 | 7/1995 | Amemiya et al. | 428/156 |
| 5,624,732 | 4/1997 | Oshima et al. | 428/167 |

FOREIGN PATENT DOCUMENTS

| | | |
|---|---|---|
| 63-257637 A | 10/1988 | Japan . |
| 4-14500 A | 1/1992 | Japan . |
| 4-117750 U | 10/1992 | Japan . |
| 7-15337 U | 3/1995 | Japan . |

*Primary Examiner*—Donald Loney
*Attorney, Agent, or Firm*—Kubovcik & Kubovcik

[57] ABSTRACT

A decorative sheet formed by a transparent sheet body having a certain thickness and having front and rear surfaces, the transparent sheet being simply provided on its front surface and rear surfaces with parallel striped patterns with predetermined pitches, to thereby produce a decorative sheet excellent in decorativeness with color tone or colors changeable with the angle of observation.

10 Claims, 5 Drawing Sheets

DECORATIVE SHEET WITH CHANGEABLE COLOR OR DENSITY

BACKGROUND OF THE INVENTION

1. Field of the Invention

The present invention relates to a decorative sheet, which is applicable to a sheet for window decoration, a bathroom curtain, and the like.

2. Description of the Background Art

In general, a well-known decorative body having a pattern or colors which vary with the angle of observation employs a lenticular plate, a polarizing plate or the like.

When a lenticular plate is used for a decorative sheet, it is necessary to correctly match the pitches of the lenticular plate and a print with each other. Thus, the manufacturing steps are complicated and the cost is increased, while the number of defects cannot be ignored. Further, the lenticular plate has a repetitive structure of semicylindrical lenses.

Therefore, a decorative sheet superposed with the lenticular plate is readily broken through slit lines which are defined by trough portions of such semicylindrical lenses.

On the other hand, a decorative body employing a polarizing plate is complicated in structure due to rotation of the polarizing plate etc., and hence the cost is disadvantageously increased.

SUMMARY OF THE INVENTION

An object of the invention is to provide a sheet which is excellent in decorativeness and has a simple structure and practical strength at a low cost, with color tone or colors varying with the angle of observation.

In order to attain this object, a transparent sheet body having a certain thickness is provided on its front and rear surfaces with parallel striped patterns at predetermined pitches according to the present invention. The striped patterns provided on the front and rear surfaces are observed in positional relation which varies with the angle of observation through the thickness of the sheet body. The striped patterns can be seen brightened when the sheet is observed at such an angle that light passing through the spaces between the stripes provided on the rear surface passes through those between the stripes provided on the front surface. On the other hand, the striped patterns can be seen darken when the sheet is observed at such an angle that the light passing through the spaces between the stripes provided on the rear surface strikes the stripes provided on the front surface and at such an angle that the light strikes the stripes provided on the rear surface. Thus, the color tone of the sheet continuously varies with the passage of the light, as the angle of observation is continuously changed.

According to the invention, the striped patterns which are provided on at least one of the front and rear surfaces of the transparent sheet body may be color-coded. Where the striped pattern provided on the front surface is color-coded, the color can be recognized when the sheet is observed at such an angle that light passing through the spaces between the stripes provided on the rear surface strikes the stripes provided on the front surface. Where the striped pattern provided on the rear surface is color-coded, on the other hand, the color can be recognized when the sheet is observed at such an angle that light strikes the striped pattern on the rear surface. Thus, the color tone or the colors of the sheet continuously vary with the changes in the passage of the light when the angle of observation is continuously changed. Thus, the sheet can be further improved in design and decorativeness.

Further, according to the invention, a pattern may be formed on at least one of the front and rear surfaces of the transparent sheet body with a pitch deviating from the predetermined pitch of the striped patterns. In this embodiment, the pitch deviation changes the positional relation between the striped pattern on the front surface and that of the rear surface. Thus, parts to be seen brightened and parts to be seen darken can be observed in variable ratios even if they are observed at the same angle of observation as in the case of no pitch deviation being provided, and the formed pattern can be clearly recognized by its color depth even at a fixed angle in a stationary state. Also, when the angle of observation is continuously changed, the color tone or the color of the formed pattern continuously varies with the angle, so that further excellent design and decorativeness is provided.

According to the invention, a projections-and-depressions pattern which is parallel to the striped patterns may be provided on at least one of the front and rear surfaces of the transparent sheet body. In this embodiment, the light is refracted on the surface of the projections-and depressions pattern so that its components interfere with each other, and the color tone or the color of the projections-and-depressions pattern can be changed with a moire fringes provided at different angles of observation, to provide a stereoscopic effect.

According to the invention, an adhesive layer may be provided on either one of the front and rear surfaces of the transparent sheet body. Since the color depth levels, colors and patterns of the decorative sheet, visually observable when viewed from the front surface, are different from those visually observable when viewed from the rear surface, the adhesive layer previously provided on the front or rear surface of the sheet body is useful for preventing the front and rear surfaces from being confused with each other. Further, it prevents air pockets when the sheet is stuck on a window and the like. In addition, it can prevent the window glass from being broken into pieces and scattered.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
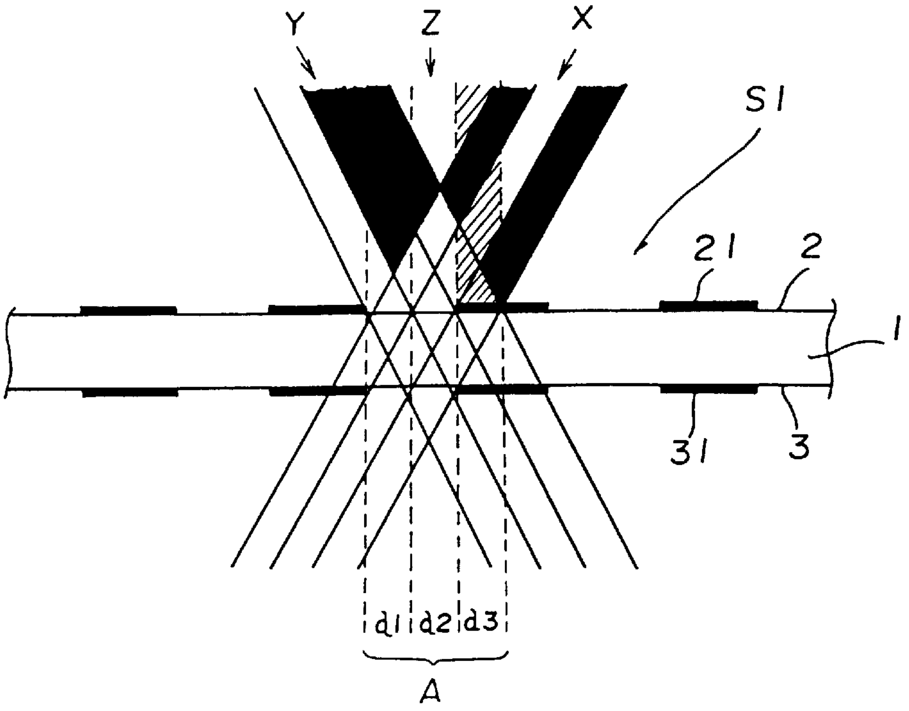
FIG. 1 is a sectional view showing a first embodiment of a decorative sheet according to the present invention.

As shown in FIG. 1, a decorative sheet S1 according to a first embodiment of the invention comprises a transparent sheet body 1 having a certain thickness. The sheet body 1 comprises a front surface 2 which is provided with a printed striped pattern 21 of a plurality of parallel straight lines with a predetermined pitch and a rear surface 3 which is also provided with a printed striped pattern 31 of a plurality of parallel straight lines with a predetermined pitch, similarly to the front surface 2.

The transparent sheet body 1 may have such a thickness that the relative positional relation between the striped patterns 21 and 31 provided on the front and rear surfaces 2 and 3 can be changed when observed from different angles. Also, the same may be made of any material which is transparent and able to transmit light. For example, a general purpose sheet of synthetic resin such as polyethylene, polypropylene, polyester, nylon, polyurethane, polyvinyl chloride, polyvinyl acetate or polyacrylic resin is employed as the material for the transparent sheet body 1, while a polyacrylic resin sheet or a soft vinyl chloride sheet is preferably employed in terms of weather resistance or flexibility.

The printing method for forming the striped patterns 21 and 31 is not particularly restricted, so far as a method such as gravure printing or offset printing enabling correct registration is employed. Further, the pitches of the striped pattern 21 printed on the front surface 2 and those of the striped patterns 31 printed on the rear surface 3 may be identical to, different from, aligned with or deviated from each other, so far as these striped patterns 21 and 31 are formed with predetermined pitches. In addition, the striped patterns 21 and 31 may be in any patterns so far as a number of parallel stripes are formed with predetermined intervals. These striped patterns 21 and 31 may be formed by straight lines, as in this embodiment, or a number of curves consisting of sine curves which are identical in wavelength and amplitude to each other and are provided in parallel with each other.

When a part A of the decorative sheet 1 is observed from a direction X in FIG. 1, light at a2 is not blocked off by the striped patterns 21 and 31 and thus is seen brightened. At a1 the light strikes on the striped pattern 31 of the rear surface 3 and does not reach the front surface 2. At a3 the light is transmitted through a space between the stripes on the rear surface 3 but strikes on the striped pattern 21 on the front surface 2. Thus, the parts at a1 and a3 are seen darkened.

When the part A is observed from a direction Y, at a1 the light is not blocked off by the striped patterns 21 and 31 and thus is seen brightened. At a2 the light strikes on the striped pattern 31 on the rear surface 3 and does not reach the front surface 2. At a3, the light is transmitted through a space between the stripes 31 on the rear surface 3 but strikes on the striped pattern 21 on the front surface 2. Thus, the parts at a2 and a3 are seen darkened.

When the part A is observed from a direction Z, the light is not blocked off by the striped patterns 21 and 31 and thus is seen brightened at a1 and a2. However, at a3 the light strikes on the striped pattern 31 on the rear surface 3 and does not reach the front surface 2, and thus the part at a3 is seen darkened.

Thus, the part A of the decorative sheet S1 has different bright and dark parts as viewed from the directions X, Y and Z, respectively. The part A is seen dark as viewed from the directions X but it is seen bright from the direction Z. With continuous changes in the angle for observing this decorative sheet S1, the light will travel along various passages so that it can pass through the rear surface 3, be blocked off by the striped pattern 31 on the rear surface 3, pass through the front surface 2, or be blocked off by the striped pattern on the front surface 21. Thus, the color tone of the decorative sheet S1 continuously varies with the passages.

In practice, the decorative sheet S1 is prepared by employing a transparent soft vinyl chloride sheet of 0.2 mm in thickness as the transparent sheet body 1, and gravure printing the striped patterns 21 and 31 of black parallel straight lines of 0.25 mm in width at pitches of 0.5 mm on the front and rear surfaces 2 and 3 of the sheet body 1 respectively in an aligned manner.

A sample of this decorative sheet S1 has been applied to window decoration, to prove that the decorative sheet is at a low cost and excellent in design and decorativeness with sufficient practical strength.

Figure 2:
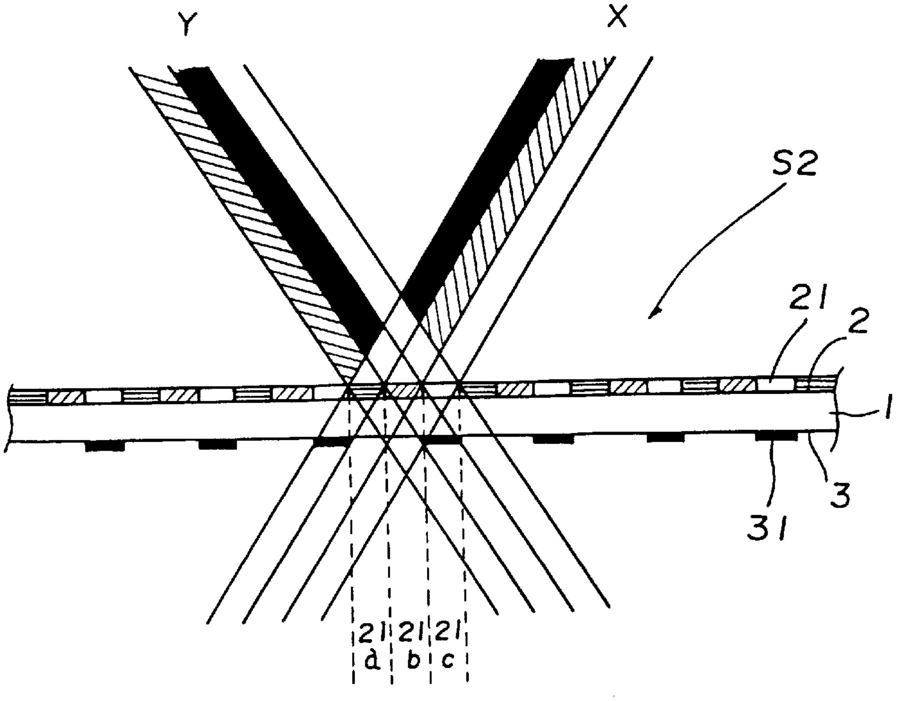
FIG. 2 is a sectional view showing a second embodiment of the present invention.

FIG. 2 shows a second embodiment of the present invention. A decorative sheet S2 according to the second embodiment is prepared by forming on a front surface 2 a striped pattern of parallel straight lines comprising multicolor printing layers 21*a*, 21*b* and 21*c*.

Also in the second embodiment, the colors of the printing layers 21*b* and 21*c* can be observed from a direction X while those of the printing layers 21*a* and 21*c* can be observed from a direction Y, similarly to the first embodiment. When the striped pattern is formed in a small pitch width, the respective colors are not distinguishable but mixedly recognized in practice. When the angle for observing the decorative sheet S2 is continuously changed, therefore, the colors appear continuously changed.

In practice, the decorative sheet S2 is prepared by employing a transparent soft vinyl chloride sheet of 0.2 mm in thickness as a transparent sheet body 1. Parallel stripes consisting of red, blue and yellow straight lines 21*a*, 21*b* and 21*c* of 0.2 mm in width are printed on the overall front surface 2 of the sheet body 1 at a pitch of 0.6 mm, and a striped pattern consisting of black parallel straight lines of 0.2 mm in width is printed on a rear surface 3 of the sheet body 1 at a pitch of 0.6 mm, so as to be in coincidence with the striped pattern on the front surface 2.

A sample of this decorative sheet S2 has been applied to formation of a bag, to prove that the decorative sheet has excellent decorativeness with the colors changeable as the bag swings.

Figure 3:
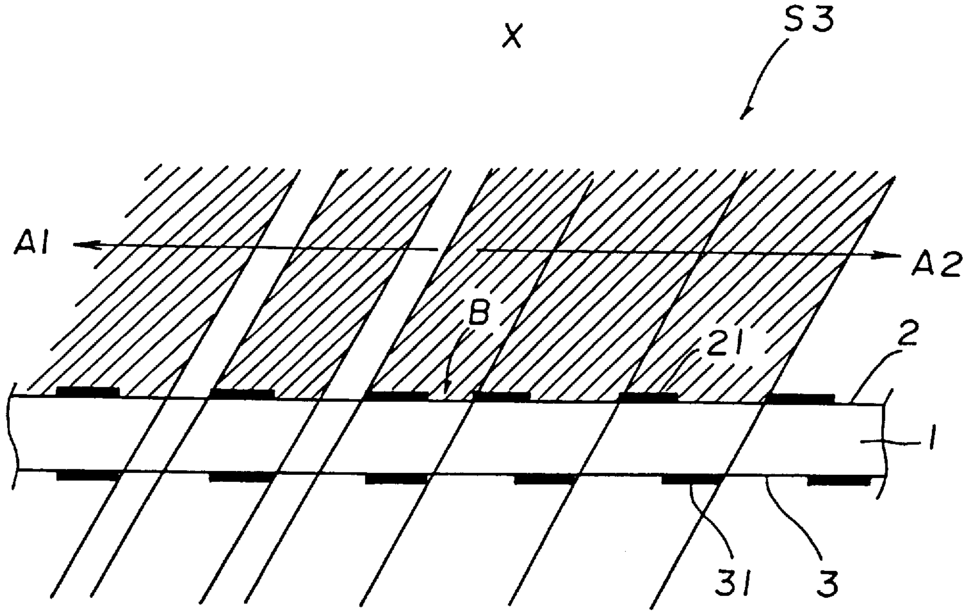
FIG. 3 is a sectional view showing a third embodiment of the present invention.

FIG. 3 shows a third embodiment of the invention.

A decorative sheet S3 has a front surface 2 on which a striped pattern 21 is shifted by a certain pitch. The pattern is seen bright at A1 but dark at A2 under the boundary of a part B of the front surface even if it is observed from a same angle. Thus, the contour of the pattern can be clearly recognized by the pattern of light and dark even if the same is observed at a fixed angle in a stationary state. In addition, when the angle of observation is continuously changed, the color tone and the color of the pattern are continuously changed.

Figure 4:
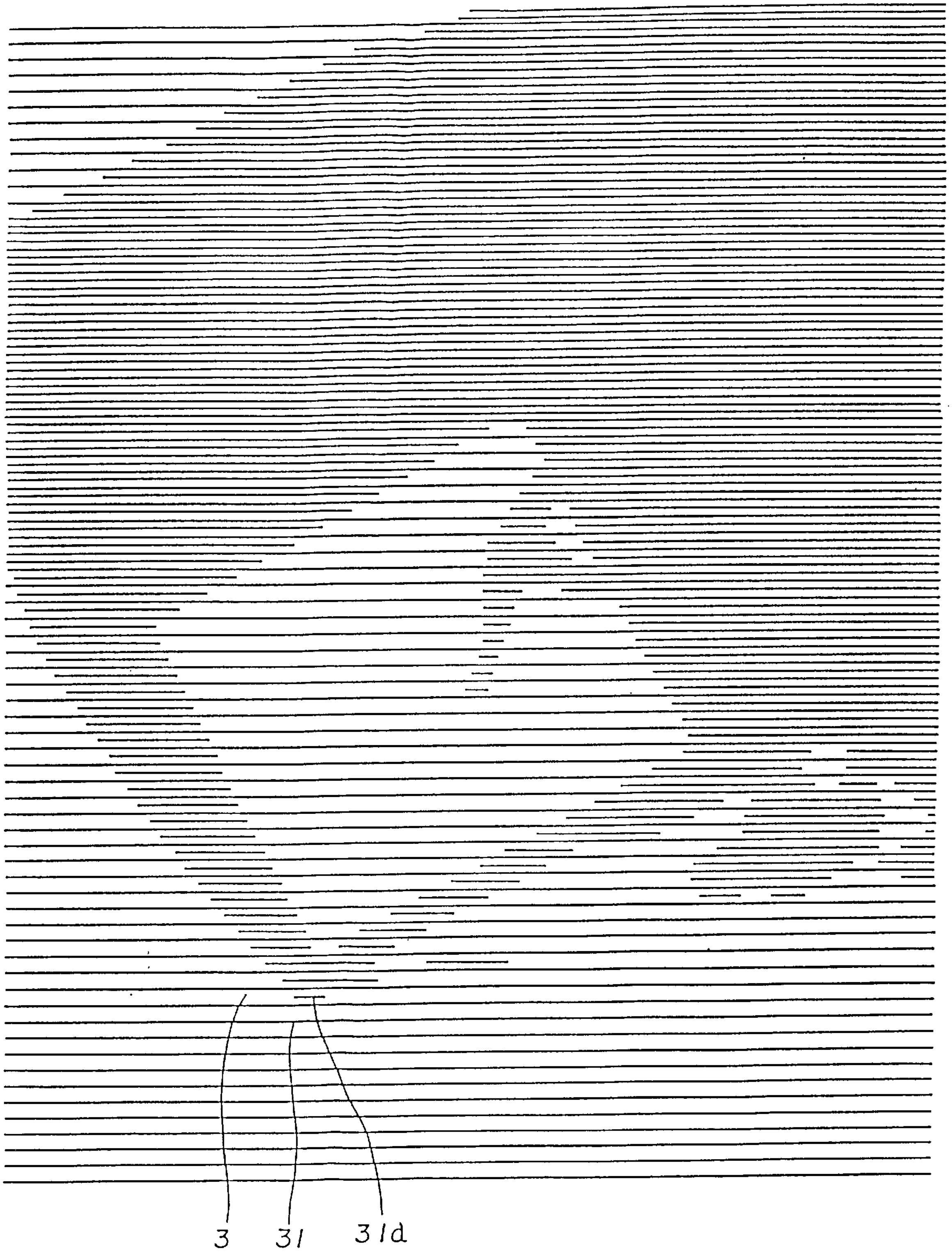
FIG. 4 is a partially enlarged view showing the rear surface of the decorative sheet according to the third embodiment of the present invention.

In practice, the decorative sheet S3 is prepared by employing an acrylic sheet of 0.3 mm in thickness as a transparent sheet body 1. A striped pattern 31 consisting of parallel stripes of 0.25 mm in width is printed on the overall rear surface 3 at a pitch of 1 mm, and a striped pattern 31*a* consisting of straight lines of 0.25 mm in width is formed with a pitch of 0.5 mm on portions of the rear surface corresponding to the pattern formed on the front surface 2. FIG. 4 is a partially enlarged view showing the rear surface 3. As shown in FIG. 4, it is possible to make the pattern further conspicuous by changing the pitch of the portions of the rear surface corresponding to the pattern formed on the front surface 2.

Figure 5:
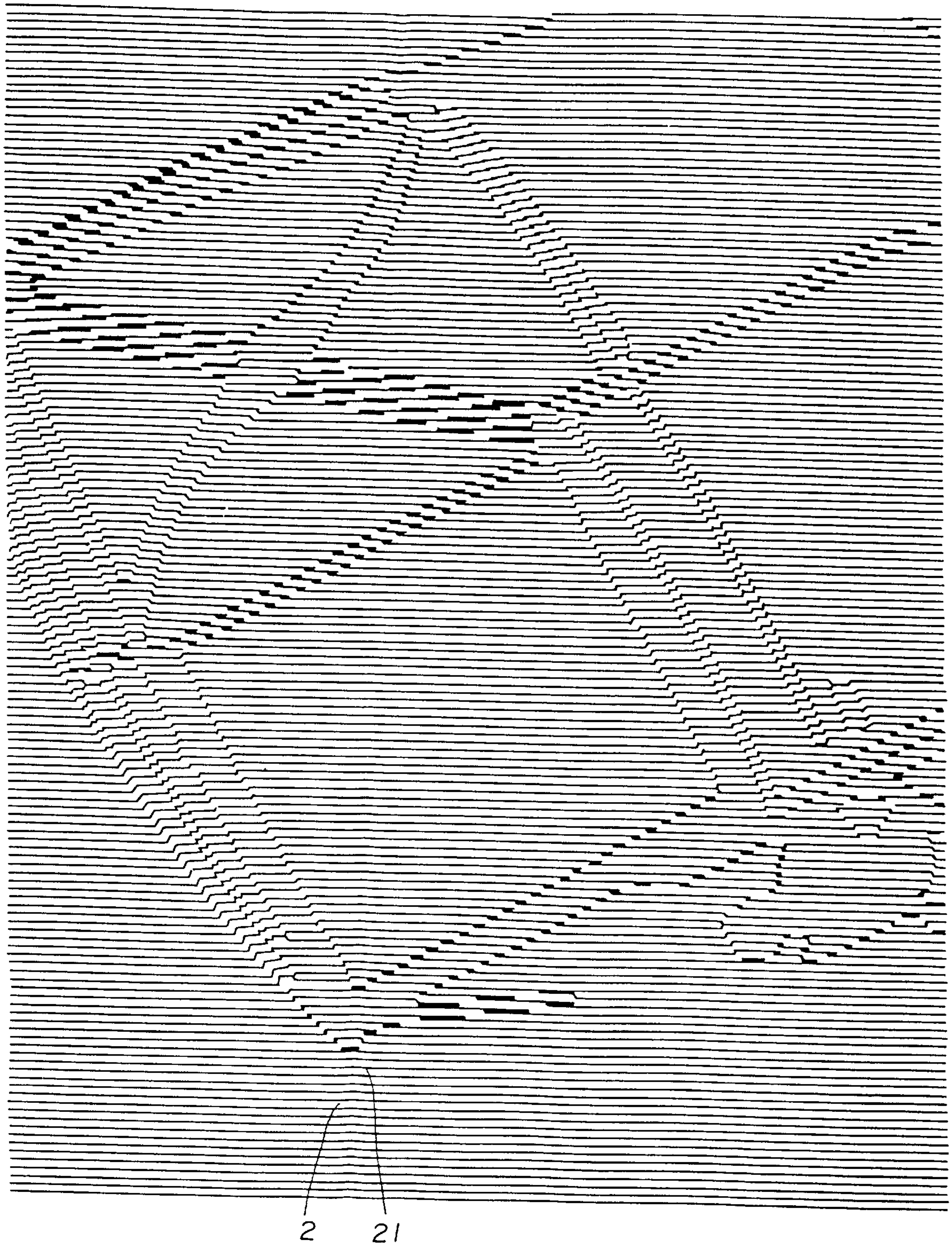
FIG. 5 is a partially enlarged view showing the front surface of the decorative sheet according to the third embodiment of the present invention.

FIG. 5 shows a partially enlarged view of the front surface 2. In FIG. 5, the striped pattern 21 consisting of parallel straight lines of 0.25 mm in width is formed on the front surface 2 at a pitch of 0.5 mm, and the contour lines of the pattern is formed by shifting the straight lines by half the pitch.

While the pattern is formed on the front surface 2 alone in the decorative sheet S3, such patterns may alternatively be formed on both of the front and rear surfaces 2 and 3, with the striped patterns 21 and 31 shifted by a certain pitch. Further, the patterns formed on both surfaces may have similar shapes. In this embodiment, the contour lines thereof are changed differently from each other, whereby further excellent decorativeness is attained.

A sample of this decorative sheet S3 has been applied to a tablecloth, to prove that the decorative sheet is at a low cost and excellent in design and decorativeness with sufficient practical strength. When the present invention is applied to such a tablecloth or the like, an opaque sheet-type substance such as an opaque sheet or nonwoven fabric is preferably stuck on either one of the front and rear surfaces of the decorative sheet.

Figure 6:
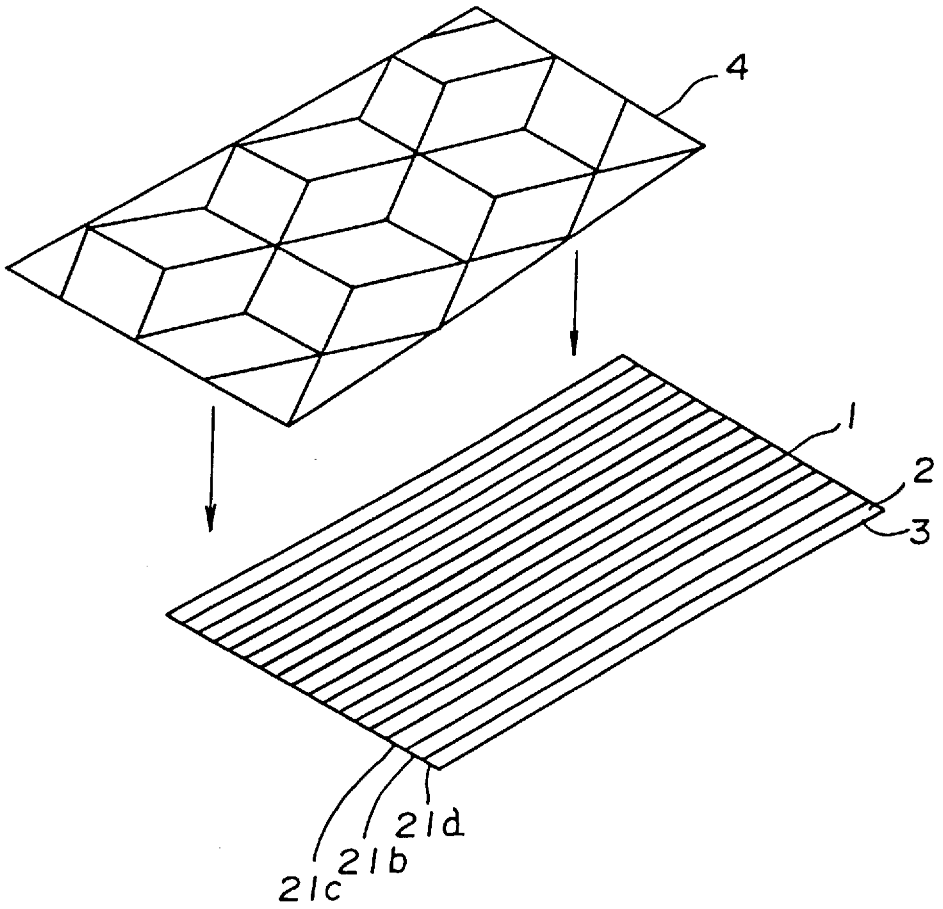
FIG. 6 is a perspective view showing a fourth embodiment of the present invention.

FIG. 6 shows a fourth embodiment of the invention.

In a decorative sheet 4 according to this embodiment, a projections-and-depressions pattern which is parallel to a striped pattern is provided on a front surface 2 of a transparent sheet body 1. In practice, the decorative sheet S4 is prepared by employing a transparent soft vinyl chloride sheet of 0.2 mm in thickness as the transparent sheet body 1. A striped pattern 21 formed of parallel black straight lines of 0.2 mm in width is printed on the front surface 2 of the sheet body 1 at a pitch of 0.4 mm. Further, a striped pattern 31 formed of red, blue and yellow straight lines 21*a,* 21*b* and 21*c* of 0.2 mm in width is printed on a rear surface 3 of the sheet body 1 at a pitch of 0.6 mm in coincidence with the striped pattern 21. Then, a sheet 4, which is a transparent soft vinyl chloride sheet of 0.3 mm on which a projections-and-depressions pattern, of combination of rhombuses formed by parallel straight lines of 0.25 mm in line width, is formed, is stuck on the transparent sheet body 1 in such a manner that the projections-and-depressions pattern is parallel to the striped pattern 21 provided on the front surface 2.

It has been recognized that light is refracted on the surface of the projections-and-depressions pattern provided on the sheet 4, so that its components interfere with each other, and the color tone or the colors of the transparent sheet body 1 are changed, with a moire fringes provided, to provide further decorativeness.

A sample of this decorative sheet S4 has been worked into a bathroom curtain and used, to prove that in places where the projections-and-depressions pattern and the straight lines of the striped pattern are parallel to each other, the colors vary with the angle of observation, with a moire fringes provided, and in the remaining places, the colors vary with the angle of observation, so that a stereoscopic effect to the decorative sheet S4 is provided.

Figure 7:
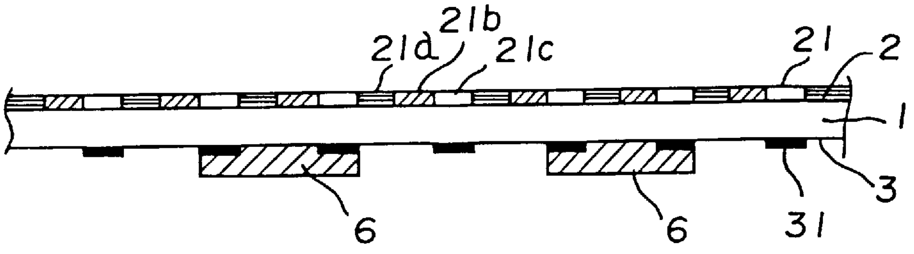
FIG. 7 is a sectional view showing a fifth embodiment of the present invention.

FIG. 7 shows a fifth embodiment of the invention.

A decorative sheet S5 according to this embodiment is formed by providing adhesive layers 6 on a rear surface 3 of a transparent sheet body. Namely, the adhesive layers 6 are formed in a stripe-shape on the rear surface 3 of the decorative sheet 5, which is identical to the decorative sheet S3 according to the third embodiment.

The adhesive layers 6 previously provided are useful for preventing the front and rear surfaces 2 and 3 of the decorative sheet S5 from being confused with each other. Further, the layers 6 prevent air accumulation when the decorative sheet S5 is stuck on a window. In addition, they can prevent the window glass from being broken into pieces and scattered.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A decorative sheet formed by a transparent sheet body having a certain thickness and having front and rear surfaces, said front and rear surfaces being provided with parallel striped patterns at predetermined pitches, at least one of said striped patterns provided on at least one of said front and rear surfaces of said transparent sheet body being color-coded, and at least one of said front and rear surfaces having a further pattern formed thereon, said further pattern comprising stripes of varying lengths and having a pitch deviated from said predetermined pitches of said striped patterns.

2. The decorative sheet in accordance with claim 1, wherein at least one of said front and rear surfaces of said transparent-sheet body is provided with a projections-and-depressions pattern parallel to said striped patterns.

3. The decorative sheet in accordance with claim 1, wherein either one of said front and rear surfaces of said transparent sheet body is provided with an adhesive layer.

4. A decorative sheet formed by a transparent sheet body having a certain thickness and having front and rear surfaces, said front and rear surfaces being provided with parallel striped patterns at predetermined pitches, characterized in that a further pattern is formed on at least one of said front and rear surfaces of said transparent sheet body, said further pattern comprising stripes of varying lengths and having a pitch deviated from said predetermined pitches of said striped patterns.

5. The decorative sheet in accordance with claim 4, wherein at least one of said front and rear surfaces of said transparent sheet body is provided with a projections-and-depressions pattern parallel to said striped patterns.

6. The decorative sheet in accordance with claim 4, wherein either one of said front and rear surfaces of said transparent sheet body is provided with an adhesive layer.

7. The decorative sheet according to any one of claims 1, 2, 3 and 4, wherein the thickness of the transparent sheet body is such that the positional relation between the parallel striped patterns provided on said front and rear surfaces varies with the angle of observation through the thickness of the transparent sheet body.

8. The decorative sheet according to any one of claims 1, 2, 3 and 4, wherein said parallel striped patterns are printed on the front and rear surfaces of said transparent sheet body.

9. The decorative sheet according to any one of claims 1, 2, 3 and 4, wherein said parallel stripes each have a width of from 0.2 to 0.25 mm.

10. The decorative sheet according to any one of claims 1, 2, 3 and 4, wherein said predetermined pitches are in the range of from 0.4 to 1 mm.

* * * * *